United States Patent
Jones et al.

(10) Patent No.: US 6,819,683 B2
(45) Date of Patent: Nov. 16, 2004

(54) COMMUNICATIONS SYSTEM AND ASSOCIATED DESKEWING AND WORD FRAMING METHODS

(75) Inventors: Nevin R. Jones, Plainfield, NJ (US); Himanshu Mahendra Thaker, Summit, NJ (US); Charles Albert Webb, III, New Providence, NJ (US); Lesley Jen-Yuan Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 846 days.

(21) Appl. No.: 09/766,079

(22) Filed: Jan. 19, 2001

(65) Prior Publication Data
US 2002/0097752 A1 Jul. 25, 2002

(51) Int. Cl.$^7$ .............................................. G01R 31/08
(52) U.S. Cl. ......................... 370/506; 370/252; 714/700
(58) Field of Search ......................... 714/700; 370/252, 370/536, 537, 522; 713/503; 712/134

(56) References Cited

U.S. PATENT DOCUMENTS

| | | | | |
|---|---|---|---|---|
| 3,868,632 A | * | 2/1975 | Hong et al. | 714/755 |
| 5,425,020 A | * | 6/1995 | Gregg et al. | 370/252 |
| 6,665,825 B1 | * | 12/2003 | Mobin et al. | 714/700 |
| 6,675,327 B1 | * | 1/2004 | Mobin et al. | 714/700 |
| 6,678,842 B1 | * | 1/2004 | Shaffer et al. | 714/700 |

* cited by examiner

Primary Examiner—Douglas Olms
Assistant Examiner—Robert W. Wilson (57) ABSTRACT

A communications system includes N parallel communications channels connecting first and second devices. The N channels may include N-1 channels for carrying information symbols, and an Nth channel for facilitating deskewing and word framing. The first device may include an alignment symbol generator for generating alignment symbols on the Nth channel, and a word framing code generator for generating word framing codes on the Nth channel. The second device may include a deskewer for aligning received information symbols based upon the alignment symbols, and a word framer for determining word framing based upon the word framing codes. The word frame code generator in the first device or transmitter, and the word framer in the second device or receiver provide the desired feature of knowledge of where each word starts or begins. The start of each word may be determined in terms of a time and a corresponding one of the N-1 channels where the word starts. The word framing code generator may generate word framing codes comprising at least one predetermined word framing code. Alternately, the word framing code generator may generate word framing codes including at least one changeable word framing code based upon information symbols.

44 Claims, 7 Drawing Sheets

COMMUNICATIONS SYSTEM AND ASSOCIATED DESKEWING AND WORD FRAMING METHODS

FIELD OF THE INVENTION

The invention relates to communications systems and methods, and, more particularly, to digital communications systems and associated methods over parallel communications channels.

BACKGROUND OF THE INVENTION

Digital communications are widely used for the transmission of voice, data and video information. Such transmission can extend over large geographical distances, between components within a personal computer, or only between adjacent circuit portions on an integrated circuit. Certain such communications applications benefit from or require the conversion of serial data into parallel data for simultaneous transmission over parallel communications channels. At the receiving end, the parallel data is desirably converted back into the serial data, and with the bits or symbols in the correct order to avoid data errors.

Unfortunately, the demand for greater data transmission volumes and at ever higher speeds, may result in skew at the receiver. In other words, the parallel communications channels may introduce different delays to the parallel symbol strings they carry. Because of skew, the parallel symbol strings at the receiver can then no longer be simply reassembled into the starting data.

The skew problem with parallel communications channels has been addressed in a number of ways. For example, U.S. Pat. No. 4,677,618 to Haas et al. recognized the dispersion introduced by wavelength division multiplexed communications channels over optical fiber. This patent discloses determining the relative delays between the channels based upon detecting two bits in a given byte of data. The relative times of arrival of the remaining bits in a byte are predetermined using the relative delay between the two detected bits and the known frequency-related dispersion characteristics of the transmission medium. Certain bits in each received byte may then be delayed using clock delay lines or registers, thereby accounting for skew.

Along similar lines, U.S. Pat. No. 5,157,530 to Loeb et al. also determines and accounts for skew imparted by dispersion in fiber optic wavelength division multiplexing. Relative delays are used to control adjustable delay devices in each channel.

U.S. Pat. No. 5,408,473 to Hutchinson et al. is directed to a technique for synchronizing run-length-limited data transmitted over parallel communications channels. Block boundary synchronization is established during connection initialization by using a property of a required HALT code to detect block boundaries received in each channel. Skew compensation is effected by comparing the times of detection of the block boundaries in the two channels, and appropriately controlling a variable delay in at least one of the channels. If there is a subsequent loss of synchronization, detected transmission errors will eventually result in connection reinitialization and reestablishment of synchronization. Unfortunately, the transmission of the fixed HALT code to detect boundaries may result in false boundary detection. Moreover, since synchronization is not continuously maintained, the technique may be impractical for higher data rates.

U.S. Pat. No. 5,793,770 to St. John et al. is directed to a high-performance parallel interface (HIPPI) to a synchronous optical network (SONET) gateway, and wherein electronic logic circuitry formats data and overhead signals into a data frame for transmission over a fiber optic channel. Stripe skew adjustment is based upon SONET framing, and, as such, the circuitry is relatively complicated, comprising as many as 20,000 logic gates, for example.

The difficulty with skew caused by parallel communications channels is also an important issue to be addressed in communications channels between integrated circuit devices. For example, higher transmission speeds increase the sensitivity to skew, as there is a smaller time window to correctly identify a received bit and have it properly align with bits received on the other parallel communications channels. To provide a higher aggregate transmission rate, the number of parallel communications channels can be increased, without increasing the speed of any given communications channel. However, this may result in significant costs for the additional communications channels. Moreover, for communications between integrated circuits, increasing the number of communications channels increases the number of pins needed for connecting the IC. The number of pins and additional packaging complexity may significantly increase the costs of such approaches.

Significant advances in approaches to deskewing are disclosed in published international patent application WO 36,797 A1, entitled "COMMUNICATIONS SYSTEM AND ASSOCIATED DESKEWING METHODS" which is assigned to the assignee of the present invention, and the entire disclosure of which is incorporated herein by reference. The application discloses a string-based framing coder which determines and appends a string-based framing code to each information symbol string of a plurality of such strings to be transmitted over parallel communications channels. The string-based framing code may be a CRC code, for example. At the receiver, a deskewer aligns the received parallel information symbol strings based upon the framing codes. This approach does consume a portion of the bandwidth, although relatively small, but which would otherwise be available for transmitting information. In certain applications this available bandwidth reduction may be undesired.

An alternate approach to address the need for deskewing has been developed by engineers at Nortel and presented at the Interim Meeting of the Optical Internetworking Forum held in Irvine, Calif. on Jan. 8–10, 2001. In accordance with the disclosed approach, an additional communications channel or reference lane is added in parallel with the communications channels which carry the information. The reference lane carries a pattern of bits based on the bits being carried by the information channels. For example, the reference lane may carry for the first four clock cycles, the information bits carried by the first information channel for the same first four clock cycles. Thereafter, the next four bits carried by the reference lane are the corresponding four bits carried by the second information channel, and so on. This pattern repeats indefinitely. The receiver includes deskewing circuitry which can align the arriving information bits based upon the pattern of reference lane bits. Unfortunately, there is no provision for determining where a particular information word begins or ends in the received information bit strings. In addition, there is no provision for how to use such a technique where the number of communications channels is not equal to the number of bits in a word.

SUMMARY OF THE INVENTION

In view of the foregoing background, it is therefore an object of the present invention to provide a communications system and associated methods for operating over parallel communications channels at relatively high rates and while accounting for skew.

These and other objects, features and advantages in accordance with the present invention are provided by a communications system comprising N parallel communications channels connecting first and second devices and comprising N−1 channels for carrying information symbols, and an Nth channel for facilitating deskewing and word framing. The first device may include an alignment symbol generator for generating alignment symbols on the Nth channel, and a word framing code generator for generating word framing codes on the Nth channel. The alignment symbol generator may generate the alignment symbols based upon information symbols on the N−1 channels. In addition, the second device may comprise a deskewer for aligning received information symbols based upon the alignment symbols, and a word framer for determining word framing based upon the word framing codes. The word frame code generator in the first device or transmitter, and the word framer in the second device or receiver provide the desired feature of knowledge of where each word starts or begins. The start of each word may be determined in terms of a time and a corresponding one of the N−1 channels where the word starts.

The word framing code generator may generate word framing codes comprising at least one predetermined or fixed word framing code. For example, the at least one predetermined word framing code may be an F628 hexadecimal code. Alternately, the word framing code generator may generate word framing codes including at least one changeable word framing code based upon information symbols. For example, the at least one changeable word framing code may comprise a CRC code.

In accordance with another aspect of the invention, the first device may further comprise a fill generator for generating fill symbols for transmission on the Nth channel. This fill generator may be used since the Nth channel typically need not be used continuously and since there may be left over space depending on the number of alignment symbols.

For similar reasons, the first device may further comprise an information loader for loading information symbols onto the Nth channel. The information loader may comprise an information field marker for generating symbols indicating the start of loaded information symbols on the Nth channel. Accordingly, the second device can recognize information symbols from the alignment symbols and word framing codes on the Nth channel.

Each information symbol may comprise a binary bit in some embodiments of the invention. The first device may also include an M'ary-to-N−1'ary converter for converting M information symbols into N−1 information symbols strings for transmission on the N−1 channels. The parallel communications channels may be provided over at least one of a wireline transmission medium, a wireless transmission medium, and an optical transmission medium.

A method aspect of the invention is for communicating over N parallel communications channels comprising N−1 channels for carrying information symbols, and an Nth channel for facilitating deskewing and word framing. The method preferably comprises generating alignment symbols on the Nth channel, generating word framing codes on the Nth channel, aligning received information symbols based upon the alignment symbols, and determining word framing based upon the word framing codes.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used in alternate embodiments to refer to similar elements.

Figure 1:
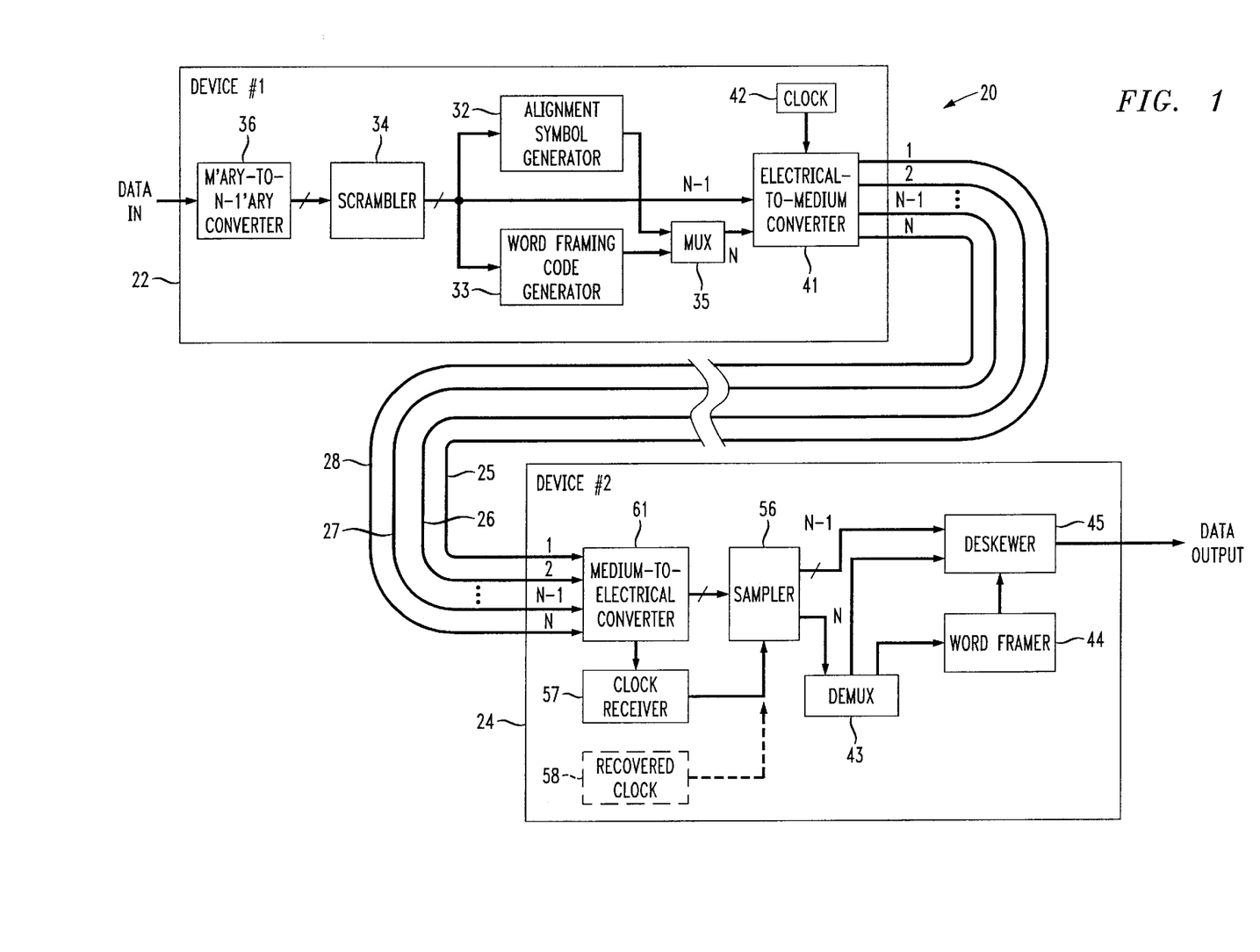
FIG. 1 is a schematic block diagram of a communications system in accordance with the present invention.

Referring initially to FIG. 1, an embodiment of a communications system 20 in accordance with the present invention is first described. The communications system 20 illustratively includes a first device 22 and a second device 24 connected by N parallel communications channels schematically represented by lines 25–28 In the illustrated embodiment, the N communications channels include N−1 information communications channels 25–27 and an Nth communications channel 28. Wireline, wireless and/or optical transmission media may be used to establish or define the N parallel communications channels 25–28 as will be readily appreciated by those skilled in the art.

One of the N−1 channels may carry a clock signal from the clock 42 at the first device 22 to the clock receiver 57 at the second device 24. Alternately, the clock may be recovered from the information channels as processed by the recovered clock circuit 58 of the second device 24 as will be appreciated by those skilled in the art.

As explained above in the Background of the Invention, parallel communications channels may present skew and word framing problems especially where the bit rate is relatively high or the distance is relatively long. For example, for an 800 Mbs rate over electrical parallel conductors, skew may limit separation distances to two inches or less.

For clarity of explanation, the following description will sometimes refer to transmitting binary information elements or information bit strings. In other words, the terms "information bits" and "information bit strings" will be sometimes used, although those of skill in the art will understand that symbols other than binary one's and zero's can also be used in accordance with the present invention. For example, a three-level information symbol may also be used and benefit from the deskewing and word framing concepts described herein.

The first device 22 illustratively includes an alignment symbol generator 32 for generating alignment symbols on the Nth channel 28. The generation of the alignment symbols will be explained in greater detail below, but is similar to the Nortel approach described in the Background of the Invention section.

The first device 22 also includes a word framing code generator 33. This word framing code generator 33 generates word framing codes on the Nth channel 28 that can be used to determine at the second device 24 the start of a word being transmitted over the other N−1 channels 25–27. The word framing codes are added to the alignment symbols in the multiplexer 35 and transmitted over the Nth channel 28.

The signals for the N parallel communications channels 25–28 are converted to the desired medium via the schematically illustrated electrical-to-medium (E/M) converter 41. At the second device 24, the transmitted signals from the N parallel communication channels 25–28 are converted back into the desired electrical signals via the illustrated medium-to-electrical signal converter 61. The received signals are sampled by the sampler 56, and processed by the demultiplexer 43, deskewer 45 and word framer 44 before being delivered as output data, typically in the form of serial data. Of course, output formats other than serial data can also be accommodated in accordance with the invention.

The deskewer 45 aligns the received information bits or symbols to account for any skew in the N communications channels. The alignment symbol generator 32 may operate by sequentially generating symbols on the Nth channel 28 from each of the N−1 channels 25–27. Accordingly, the deskewer 45 typically operates using the alignment symbols based upon the symbols being transmitted in the N−1 information channels 25–27.

The word framer 44 may operate using either one or more predetermined word framing codes. For example, the word framing code generator 33 may generate a fixed code, such as F268 hexadecimal, which is used for framing in SONET communications systems as will be appreciated by those skilled in the art. Accordingly, the word framer 44 would detect or determine this code on the Nth channel 28 to thereby indicate the start of a word. As will be appreciated by those skilled in the art, the first bit or start of a word may be based upon both the time slot and the respective or corresponding channel on which this first bit appears.

As will also be appreciated by those skilled in the art, changing or changeable word framing codes are also contemplated by the present invention. The changing word framing code may be based upon information bits transmitted on the other channels. For example, the word framing codes could be based upon cyclic redundancy checking (CRC) techniques. A CRC-16 algorithm may be particularly useful for the word framing code generation of the present invention. A particular advantage of the CRC word frame coding is that a straightforward hardware implementation can be achieved with a relatively small number of logic gates as will be appreciated by those skilled in the art. CRC codes are also resistant to false framing while adding relatively little overhead. Fixed framing in contrast, may be somewhat more likely to experience false framing for a similar number of code bits. Of course, other similar techniques may also be used.

Systems including N−1 channels 25–27 equal to the number of bits in a word, for example, will have the start of words occurring in a repetitive fashion on the same communications channel. However, other systems not meeting this criteria will have words starting on different communications channels at different times. The present invention including the word framing feature is particularly advantageous for such systems.

A scrambler 34 is connected upstream from the alignment symbol generator 32 and word framing code generator 33 of the first device 22. The scrambler 34 may be desirable to avoid long strings of null values which could hinder clock recovery as will be appreciated by those skilled in the art. Such an optional scrambler may a self-synchronizing scrambler, such as a X^43 scrambler as will be appreciated by those skilled in the art.

An M'ary-to-N−1'ary mapper or converter 36 is illustratively connected upstream of the scrambler 34. The M'ary-to-N−1'ary converter 36 converts the incoming Mbits to N−1 parallel information bit strings for subsequent transmission over the N−1 parallel communications channels 25–27. The M'ary-to-N−1'ary converter 36 is conventional and requires no further discussion herein.

Figure 2:
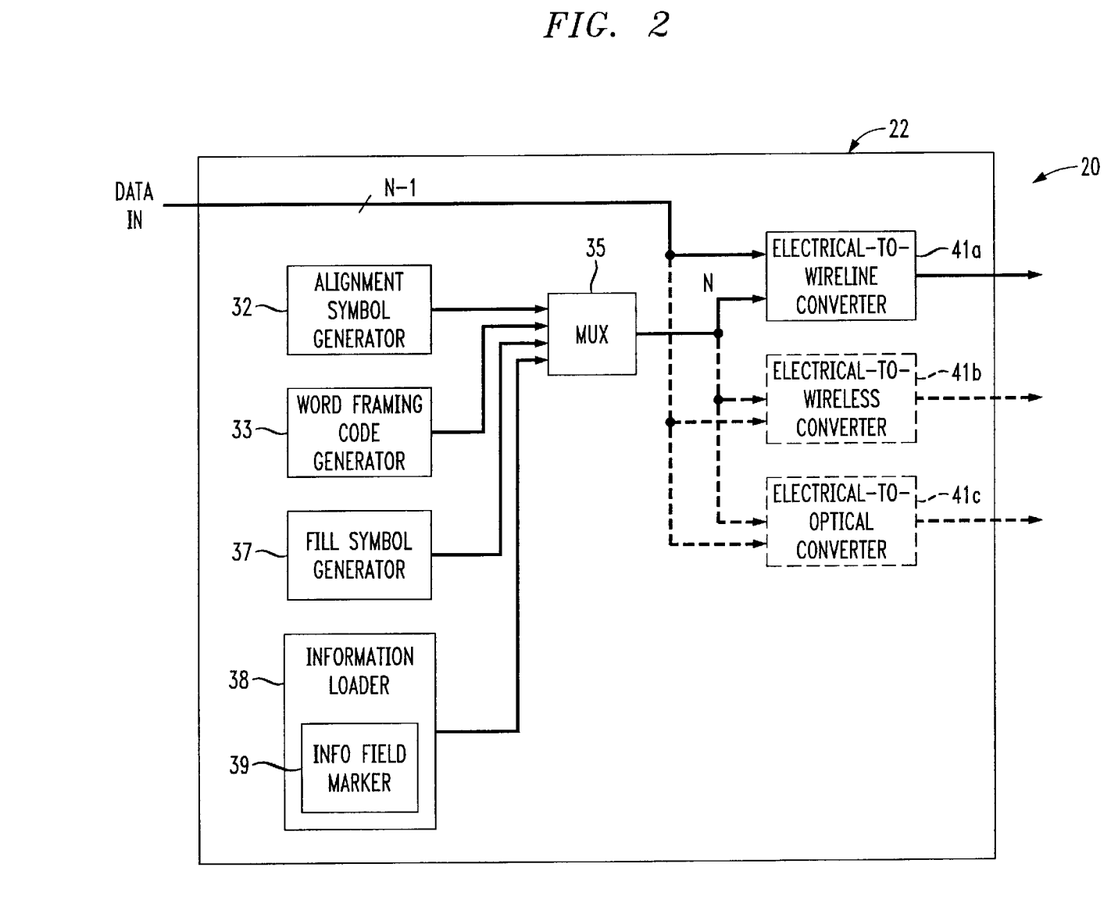
FIG. 2 is a more detailed schematic diagram of the of the first device as shown in FIG. 1.

Referring now additionally to FIG. 2, other aspects of the system 20 are now described. In particular, the first device 22 may include a fill symbol generator 37 for generating fill symbols. In addition, the second device 22 may also include an information loader 38. The information loader 38 also illustratively includes an information field marker 39 which will generate a marker to indicate to the second device that information or a message is being transmitted in the succeeding bits, for example.

In the illustrated embodiment, the E/M converter can be provided by an electrical-to-wireline converter 41a, an electrical-to-wireless converter 41b, or an electrical-to-optical converter 41c. Of course, the second device would include corresponding converters based upon the communications channel medium as will be appreciated by those skilled in the art.

The electrical-to-wireline converter 41a may connect to wireline media in the form of printed circuit board tracks, individual wires, coaxial cable, or twisted pair cable, for example. The medium may be a data bus, such as a PCI bus, for example. A typical PCI bus is limited to a relatively low frequency of about 60–70 MHZ. Accordingly, for greater information throughput wider buses are needed. The present invention overcomes this difficulty and can allow a PCI bus to operate at a faster clock speed without additional bus width.

One particularly advantageous use of the tradeoff in converter speed versus number of parallel communication channels is for optical implementations, such as for those in accordance with the synchronous optical network (SONET) and/or synchronous digital hierarchy (SDH) standards. In particular, wavelength division multiplexing (WDM) and dense wavelength division multiplexing (DWDM) are highly developed and permit a relatively large number of communications channels to be established at different optical wavelengths as will be appreciated by those skilled in the art. For example, a larger number of lower rate OC-X converters may be used in place of a lesser number of higher rate converters. The aggregate rate across the fiber can be relatively high. For example, an OC-192 converter may be 100 times the cost of a OC-48 converter. Accordingly, the communications system 20 may be less expensive than comparable aggregate transmission rate systems using higher speed optical converters.

Figure 3:
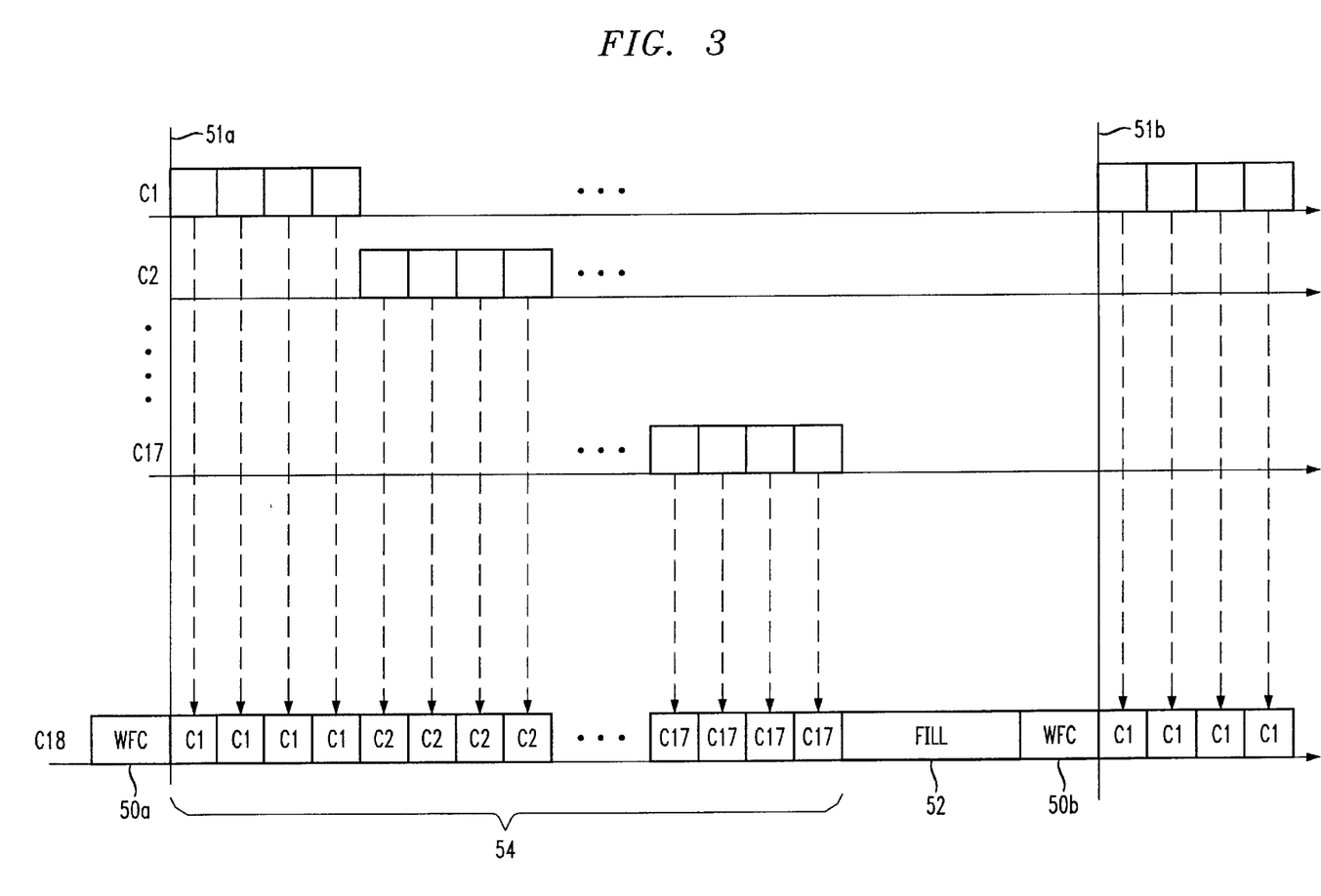
FIG. 3 is a first exemplary schematic bit position diagram of the N communications channels from the system as shown in FIG. 1.
Figure 4:
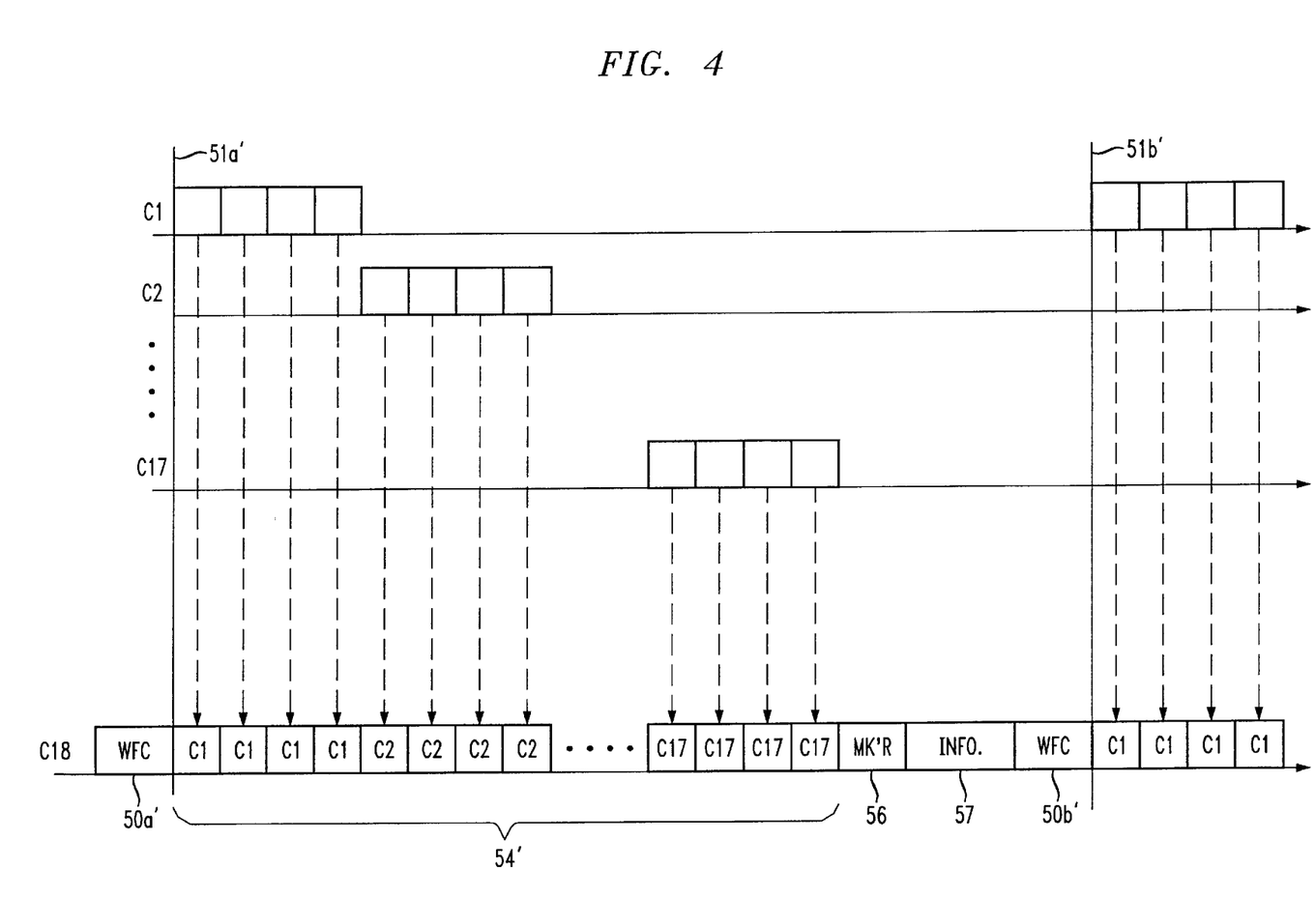
FIG. 4 is a second exemplary schematic bit position diagram of the N communications channels from the system as shown in FIG. 1.

Turning now additionally to FIGS. 3 and 4, the bits or symbols transmitted over the Nth channel are described in greater detail. In the illustrated embodiment, N−1 is equal to seventeen, although in other embodiments, N−1 can be greater than seventeen or less than seventeen. The Nth channel is the eighteenth channel C18, and the seventeenth channel C17 is used for control and not data. For further purposes of example, the first sixteen channels may carry information in the form of 64 bit words, and the seventeenth channel may be a control channel.

As can be seen at the lower left hand portion of the figure, a first word framing code 50a is generated and transmitted on the eighteenth channel C18. This first word framing code 50a indicates the first word boundary indicated by the vertical line 51a.

Thereafter, the alignment symbols or bits 54 are generated and transmitted. In the illustrated embodiment, the four bits from channel C1 are transmitted over the eighteenth channel C18, followed by the four bits from the second channel C2, etc., until the pattern is completed at the last of the four bits of the seventeenth channel C17. Of course, the number of bits transmitted in sequence from each communications channel may be different than four bits. In addition, the alignment bits 54 may not be identical to the corresponding communications channel bits, but can be related to or based thereon. The number of alignment bits selected from each channel in succession is related to the amount of skew or misalignment that can be addressed as will be appreciated by those skilled in the art.

Given in this example that the first sixteen channels carry information in the form of 64 bit words, and the seventeenth channel is the control channel, fill bits 52 are added to the end of the sequence of alignment bits 54 until the next word framing code 50b is generated and transmitted. This next word framing code 50b defines a next word boundary 51b. Of course, it may not be necessary to provide the word framing codes for the start of every word. Typically this could be done at start-up and at selected intervals thereafter. This also applies to the generation and transmission of the alignment bits 54. The relative positions of the fill bits 52, alignment bits 54 and word framing code bits 50a may be interchanged from that shown in the illustrated diagram as will be appreciated by those skilled in the art.

The fill bits 52 are unused in the example illustrated in FIG. 3; however, as shown in FIG. 4, these bits can be used to transmit information. More particularly, marker bits 56 can be provided to indicate the start or presence of the information bits 57. The marker bits 56 may also be used to indicate the type of information bits 57 being sent over the eighteenth channel C18. Those other portions of FIG. 4 indicated with prime notation are similar to those corresponding portions in FIG. 3 and require no further discussion herein. In other embodiments, a combination of fill bits along with the marker bits and information bits may be provided as will be appreciated by those skilled in the art.

Figure 5:
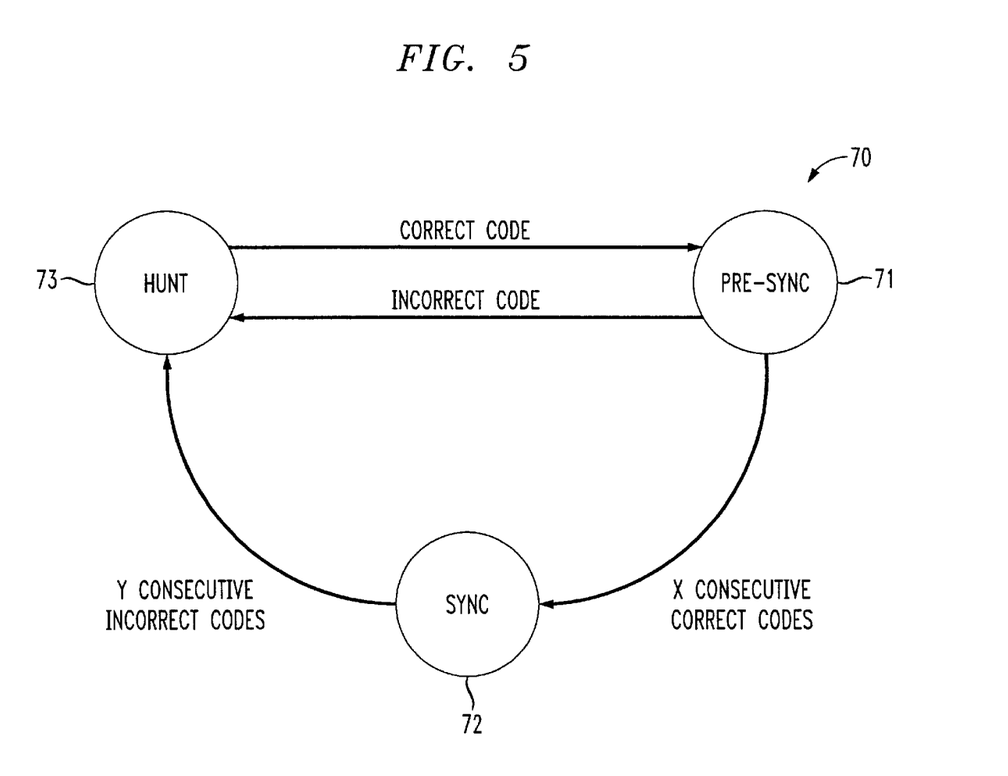
FIG. 5 is a schematic diagram of a framing state machine as may be used in the second device as shown FIG. 1.

Referring now briefly to FIG. 5, some additional framing or synchronization concepts are now explained. In particular, the illustrated state framing machine 70 has three states: a pre-sync state 71, a hunt state 73 and a sync state 72. Transition between the hunt and pre-sync states is determined based upon a correct or incorrect word framing code. The machine 70 changes from the pre-sync state 71 to the sync state 72 if X consecutive correct codes are determined. The machine 70 transitions from the sync state 72 to the hunt state 73 if there are Y consecutive incorrect codes determined. The state framing machine 70 is very similar to state framing machines used in other known data synchronizing applications as will be appreciated by those skilled in the art.

Figure 6:
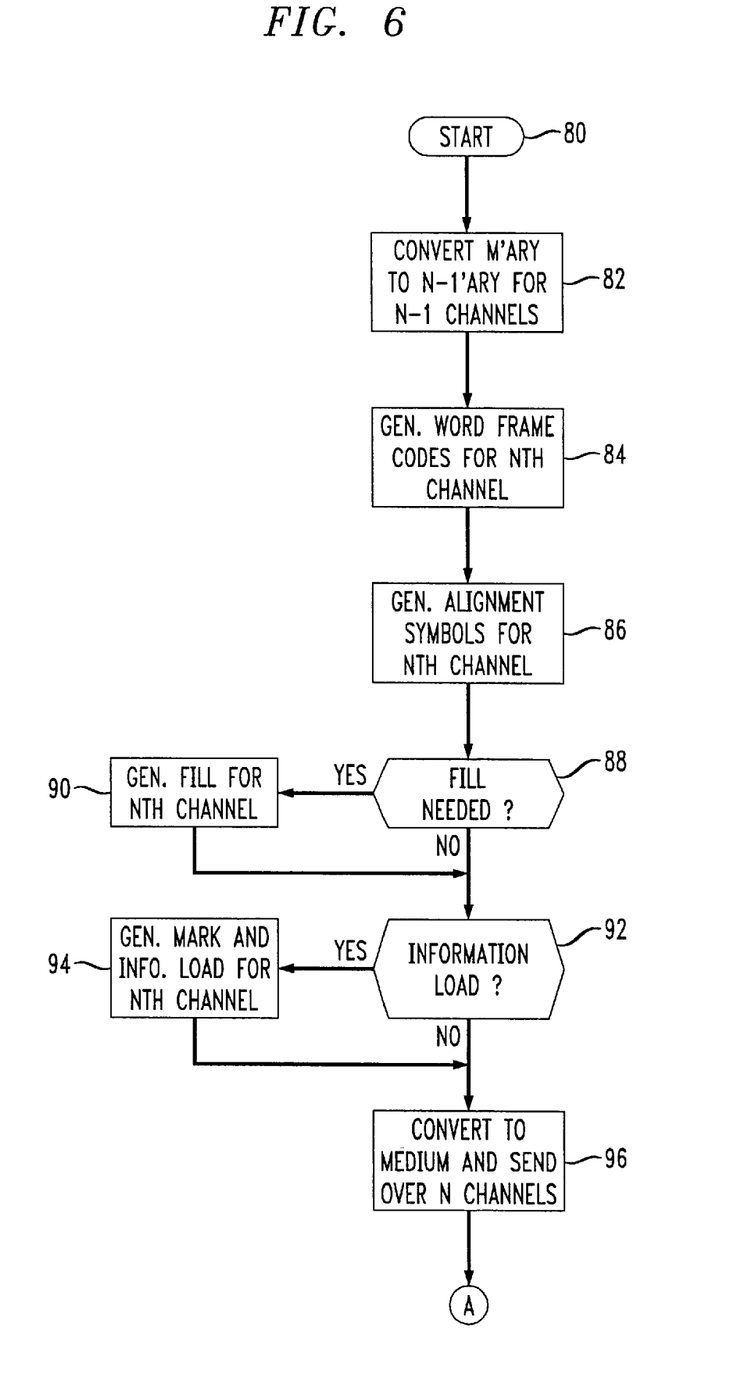
FIGS. 6 and 7 are flowcharts for the operation of the system as shown in FIG. 1.
Figure 7:
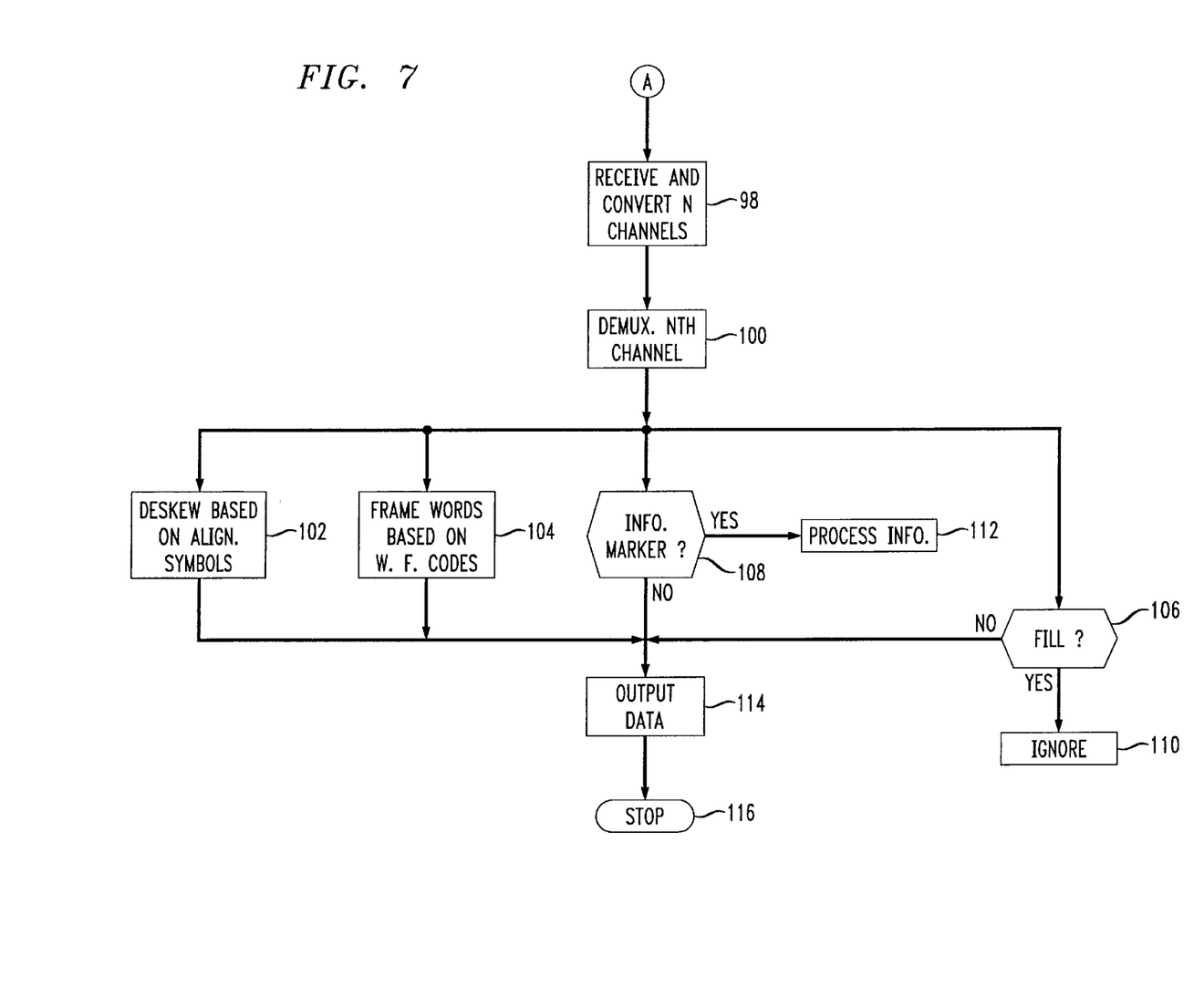

Referring now to flowcharts of FIGS. 6 and 7 various method aspects of the invention are now described. From the start (Block 80), the input data is converted at Block 82 from M'ary to N-1'ary for transmission over N-1 communication channels. The word framing codes are generated (Block 84) along with the alignment symbols (Block 86) and it is determined whether fill symbols are needed at Block 88. If so, these are generated at Block 90.

If desired, it may also be determined whether it is desired to load information onto the Nth channel at Block 92. If so, an information field marker may be generated and the information loaded onto the Nth channel at Block 94. At Block 96 the signals are converted to the desired transmission medium and sent over the N parallel communications channels. These steps for transmission may be carried out in different orders from those illustrated, and, indeed, some of the steps may even be performed in parallel.

Continuing to the receive portion of FIG. 7, at Block 98 the signals are received from the N channels and converted to electrical form. At Block 100 the Nth channel is demultiplexed or processed. Deskewing based on the alignment symbols is provided at Block 102, while word framing based on the word framing symbols occurs at Block 104.

If fill bits were added as determined at Block 106 these are removed or ignored at Block 110. If an information field marker is determined at Block 108, then the information may be further processed at Block 112. The data is output at Block 114 before stopping (Block 116). These steps for receiving may be carried out in different orders from those illustrated as will be appreciated by those skilled in the art.

The communications system 20 with its deskewing and word framing features permits higher bit rates and/or longer transmission distances. Information may also be transmitted over unused portions of the channel used for the deskewing and word framing. The higher bit rates may permit a reduction of pin count for communication between integrated circuit chips. As the cost for additional pins and packaging complexity may be relatively high, the present invention also permits lower cost communications ICs having an aggregate communication rate that is still relatively high as will be appreciated by those skilled in the art.

The present invention also simplifies implementation of the deskew logic circuitry, such as may be implemented using a field programmable gate array (FPGA). This is so since it the invention does not require the multiple comparators that would otherwise be needed to perform the deskewing function.

As will also be appreciated by those skilled in the art, although only one direction of communication has been illustrated, other embodiments of the communications system 20 may include circuitry to implement a reverse direction of communications. In other words, the present invention is also readily applicable to full-duplex communications systems as well. In addition, multiple receiving devices may be connected to one or more transmitting devices as will also be appreciated by those skilled in the art.

Indeed, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A communications system comprising:
   a first device and a second device; and
   N parallel communications channels connecting said first and second devices and comprising N−1 channels for carrying information symbols, and an Nth channel for facilitating deskewing and word framing;
   said first device comprising
      an alignment symbol generator for generating alignment symbols on said Nth channel, and a word framing code generator for generating word framing codes on said Nth channel; and said second device comprising a deskewer for aligning received information symbols based upon the alignment symbols, and a word framer for determining word framing based upon the word framing codes.

2. A communications system according to claim 1 wherein said word framing code generator generates word framing codes indicating a start of each word.

3. A communications system according to claim 1 wherein said word framing code generator generates word framing codes indicating a start of each word based upon a time and a corresponding one of the N-1 channels.

4. A communications system according to claim 1 wherein said word framing code generator generates word framing codes comprising at least one predetermined word framing code.

5. A communications system according to claim 4 wherein the at least one predetermined word framing code comprises an F628 hexadecimal code.

6. A communications system according to claim 1 wherein said word framing code generator generates word framing codes comprising at least one changeable word framing code based upon information symbols.

7. A communications system according to claim 6 wherein the at least one changeable word framing code comprises a CRC code.

8. A communications system according to claim 1 wherein said first device further comprises a fill generator for generating fill symbols for transmission on said Nth channel.

9. A communications system according to claim 1 wherein said first device further comprises an information loader for loading information symbols onto said Nth channel.

10. A communications system according to claim 9 wherein said information loader comprises an information field marker for generating information indicating symbols indicating loaded information symbols on said Nth channel.

11. A communications system according to claim 1 wherein said alignment symbol generator generates alignment symbols based upon information symbols on said N-1 channels.

12. A communications system according to claim 1 wherein each information symbol comprises a binary bit.

13. A communications system according to claim 1 wherein said first device further comprises an M'ary-to-N-1'ary converter for converting M information symbols into N information symbols strings for transmission on said N-1 channels.

14. A communications system according to claim 1 wherein said N parallel communications channels are provided over at least one of a wireline transmission medium, a wireless transmission medium, and an optical transmission medium.

15. A communications system comprising:

a first device and a second device; and

N parallel communications channels connecting said first and second devices and comprising N-1 channels for carrying information symbols, and an Nth channel;

said first device comprising an alignment symbol generator for generating alignment symbols on said Nth channel, the alignment symbols being based upon information symbols on said N-1 channels, and a word framing code generator for generating word framing codes on said Nth channel, the word framing codes indicating a start of each word based upon a time and a corresponding one of the N-1 channels; and said second device comprising a deskewer for aligning received information symbols based upon the alignment symbols, and a word framer for determining word framing based upon the word framing codes.

16. A communications system according to claim 15 wherein said word framing code generator generates word framing codes comprising at least one predetermined word framing code.

17. A communications system according to claim 15 wherein said word framing code generator generates word framing codes comprising at least one changeable word framing code based upon information symbols.

18. A communications system according to claim 15 wherein said first device further comprises a fill generator for generating fill symbols for transmission on said Nth channel.

19. A communications system according to claim 15 wherein said first device further comprises an information loader for loading information symbols onto said Nth channel.

20. A communications system according to claim 19 wherein said information loader comprises an information field marker for generating information indicating symbols indicating loaded information symbols on said Nth channel.

21. A communications system according to claim 15 wherein said first device further comprises an M'ary-to-N-1'ary converter for converting M information symbols into N information symbols strings for transmission on said N-1 channels.

22. A communications system according to claim 15 wherein said N parallel communications channels are provided over at least one of a wireline transmission medium, a wireless transmission medium, and an optical transmission medium.

23. A communications device for transmitting over N parallel communications channels comprising N-1 channels for carrying information symbols and an Nth channel for facilitating deskewing and word framing, the communications device comprising:

an alignment symbol generator for generating alignment symbols on the Nth channel for facilitating deskewing; and a word framing code generator for generating word framing codes on the Nth channel for facilitating word framing.

24. A communications device according to claim 23 wherein said word framing code generator generates word framing codes indicating a start of each word.

25. A communications device according to claim 23 wherein said word framing code generator generates word framing codes indicating a start of each word based upon a time and a corresponding one of the N-1 channels.

26. A communications device according to claim 23 wherein said word framing code generator generates word framing codes comprising at least one predetermined word framing code.

27. A communications device according to claim 23 wherein said word framing code generator generates word framing codes comprising at least one changeable word framing code based upon information symbols.

28. A communications device according to claim 23 further comprising a fill generator for generating fill symbols for transmission on the Nth channel.

29. A communications device according to claim 23 further comprising an information loader for loading information symbols onto the Nth channel.

30. A communications device according to claim 29 wherein said information loader comprises an information field marker for generating information indicating symbols indicating loaded information symbols on said Nth channel.

31. A communications device according to claim 23 wherein said alignment symbol generator generates alignment symbols based upon information symbols on the N−1 channels.

32. A communications device for receiving from N parallel communications channels comprising N−1 channels for carrying information symbols, and an Nth channel for facilitating deskewing and word framing, the communications device comprising:

a deskewer for aligning received information symbols based upon alignment symbols received over the Nth channel; and a word framer for determining word framing based upon word framing codes received over the Nth channel.

33. A communications device according to claim 32 wherein said word framer determines word framing from word framing codes indicating a start of each word based upon a time and a corresponding one of the N−1 channels.

34. A communications device according to claim 32 wherein said word framer determines word framing from word framing codes comprising at least one predetermined word framing code.

35. A communications device according to claim 32 wherein said word framer determines word framing based upon at least one changeable word framing code.

36. A communications device according to claim 32 wherein said deskewer aligns from alignment symbols based upon information symbols on the N−1 channels.

37. A method for communicating over N parallel communications channels comprising N−1 channels for carrying information symbols and an Nth channel for facilitating deskewing and word framing, the method comprising:

generating alignment symbols on the Nth channel;

generating word framing codes on the Nth channel;

aligning received information symbols based upon the alignment symbols on the Nth channel; and determining word framing based upon the word framing codes on the Nth channel.

38. A method according to claim 37 wherein generating word framing codes comprises generating word framing codes indicating a start of each word based upon a time and a corresponding one of the N−1 channels.

39. A method according to claim 37 wherein generating word framing codes comprises generating word framing codes comprising at least one predetermined word framing code.

40. A method according to claim 37 wherein generating word framing codes comprises generating word framing codes comprising at least one changeable word framing code based upon information symbols.

41. A method according to claim 37 further comprising generating fill symbols on the Nth channel.

42. A method according to claim 37 further comprising loading information symbols onto the Nth channel.

43. A method according to claim 37 wherein generating alignment symbols comprises generating alignment symbols based upon information symbols on the N−1 channels.

44. A method according to claim 37 wherein the N parallel communications channels are provided over at least one of a wireline transmission medium, a wireless transmission medium, and an optical transmission medium.

* * * * *